(No Model.) 2 Sheets—Sheet 1.
J. WYCKOFF, C. W. LUNQUIST & M. J. SMITH.
FRICTION BRAKE FOR CARS.
No. 436,750. Patented Sept. 16, 1890.
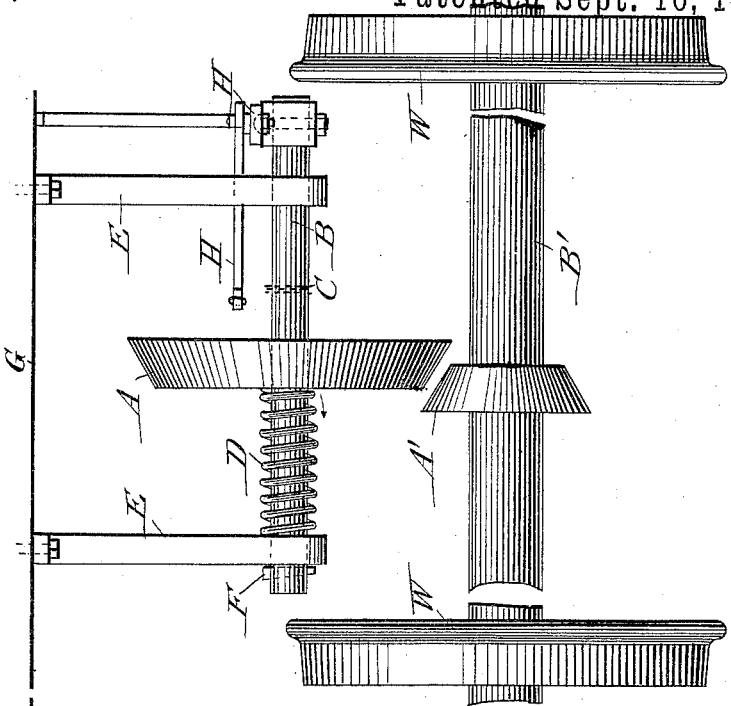
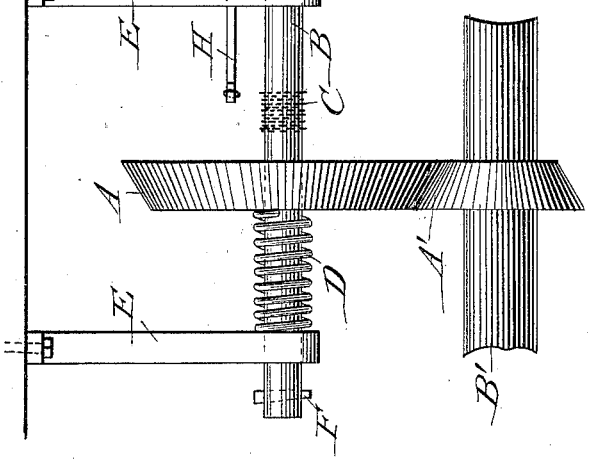
Attest:
F. H. Schott
E. Wilkinson
Inventors:
John Wyckoff
Charles W. Lunquist
Michael J. Smith
by C. S. Whitman
Atty (No Model.) 2 Sheets—Sheet 2.
J. WYCKOFF, C. W. LUNQUIST & M. J. SMITH.
FRICTION BRAKE FOR CARS.
No. 436,750. Patented Sept. 16, 1890.
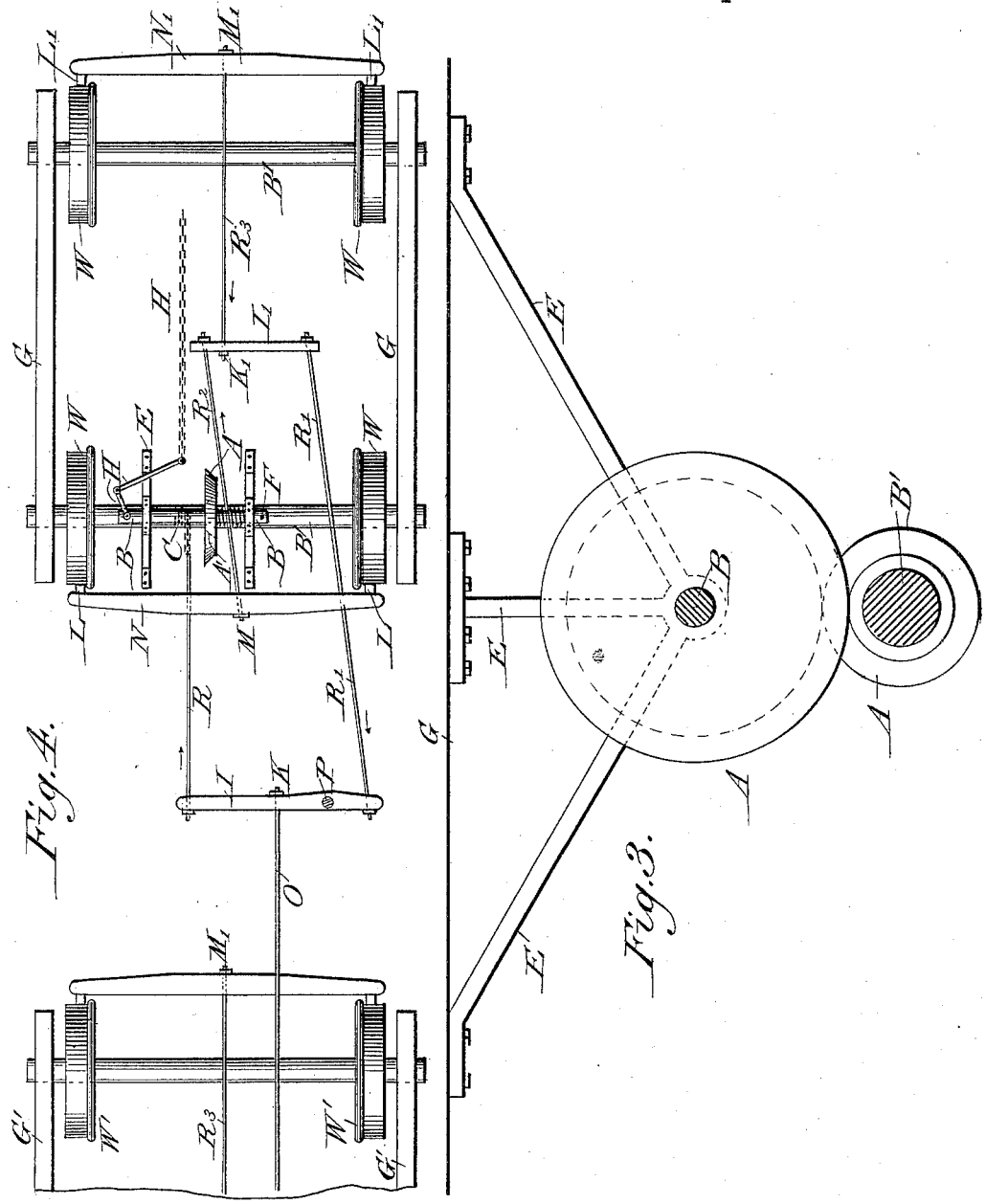

UNITED STATES PATENT OFFICE.

JOHN WYCKOFF, CHARLES W. LUNQUIST, AND MICHAEL J. SMITH, OF MINNEAPOLIS, MINNESOTA; SAID LUNQUIST AND SMITH ASSIGNORS TO CHAS. G. LAYBOURN, OF SAME PLACE.

FRICTION-BRAKE FOR CARS.

SPECIFICATION forming part of Letters Patent No. 436,750, dated September 16, 1890.

Application filed May 20, 1890. Serial No. 352,503. (No model.)

*To all whom it may concern:*

Be it known that we, JOHN WYCKOFF, CHARLES W. LUNQUIST, and MICHAEL J. SMITH, citizens of the United States, residing at Minneapolis, in the county of Hennepin and State of Minnesota, have invented certain new and useful Improvements in Friction-Brakes to be Used in the Operation of all Kinds of Railway-Cars; and we do hereby declare the following to be a full, clear, and exact description of the invention, such as will enable others skilled in the art to which it appertains to make and use the same.

Our invention relates to brakes for all kinds and classes of railway-cars, whether impelled by locomotive, cable, electricity, water, horses, or gravity, where some obstructing-force is required to stop, slow down, or impede the progress of the car.

Our invention consists, essentially, in the combination of a "wheel and axle" with a system of rods and levers, whereby the winding up of a chain on the axle actuates the system of rods and levers and presses the brakes firmly against the wheels of the car. The wheel of the wheel and axle is a friction-wheel, preferably beveled, attached to a shaft, which shaft is rigidly held against lateral motion, but has a slight play longitudinally, in order that the friction-wheel may be brought into contact with a similar wheel rigidly secured to one of the axles of the car. The two friction-wheels are normally held apart by a spring on the sliding shaft; but when it is desired to put on brakes the friction-wheels are brought into contact by any suitable mechanical device. It will then be seen that the larger friction-wheel will be caused to revolve, which will wind up the chain, and actuating the levers will bring the brakes firmly against the wheels of the car. It will be readily seen that the greater the number of revolutions made by the larger friction-wheel the more the chain will be wound up and the more firmly will the brakes be applied to the wheels of the car.

Our invention will be hereinafter more fully described and then pointed out in the claims.

Reference is had to the accompanying drawings, wherein—

Figure 1 represents a front view of our wheel and axle in its normal condition—viz., not in use. Fig. 2 represents a front view of the same in operation. Fig. 3 represents a section perpendicular to the axes of the two axles and showing the mode of securing the friction-wheel to the car. Fig. 4 represents a plan view of the brakes, just going into action, of the system of rods and levers by which the motion of the car-wheels is transferred to the brakes. It shows the operation of our invention on only one truck of a car.

Referring more particularly to the drawings, where the same letters indicate the same parts, (many parts not essential to our invention are omitted,) A, Figs. 1 to 4, represent the larger friction-wheel, secured to the sliding shaft B.

D, Figs. 1 and 2, represents a stout spring engaging said shaft and arranged so as to remove the beveled friction-wheel A from contact with the smaller wheel A' when the brakes are taken off.

C represents the chain secured to the shaft B.

E E represent the frame-work carrying the journals, which frame-work is attached to the bottom timbers of the car C.

F is a key to limit the longitudinal play of the shaft B.

B' is the axle, and W W are the wheels of the car.

In Fig. 4 the friction-wheel A' is beneath and hidden by the friction-wheel A.

H represents a bent lever and chain or other suitable device for imparting longitudinal motion to the shaft B and friction-wheel A.

I represents a lever pivoted to the bottom of the car at P and connected to the rods R and R', and also to a rod O, by which the brakes on the other truck of the car may be actuated.

I' represents a lever whereof the end K' of the rod R³ acts as the movable fulcrum.

L L L' L' represent the brakes at the ends of the beams N and N'. The beams N and N' are by means of springs or other appliances normally held so that the brakes may be clear of the car-wheels.

The operation of our invention is as follows: When it is desired to put on brakes the friction-wheel A is pressed against the bevel-wheel A' by means of the bent lever H or such other device as would readily suggest itself to any mechanic. The bevel-wheel A', being fixed on the axle B', transmits the motion of the car-wheels to the friction-wheel A, which, revolving, winds up the chain C on the shaft B. This pulls the lever I, which draws the rod R', which draws the lever I' and the rods $R^2$ and $R^3$ all in the direction indicated by the arrow-heads. Thus the effect of bringing the friction-wheels A and A' into contact is to wind up the chain C, and thus to press the brakes firmly against the wheels of the car. The rod O, connected to the lever I at K, is for the purpose of continuing our system of rods and levers to the other truck of the car; but it will be seen that it is immaterial to the applicability of our invention whether we use one pair of bevel-wheels to each truck or one only to each car. Hence the rod O may be added or omitted without impairing the merits of our invention.

We do not wish to limit ourselves to the devices described and shown, as many modifications which could be used without departing from the spirit of the invention would readily suggest themselves to a skilled mechanic.

Having thus described our invention in such clear and unmistakable terms that any one skilled in the art may manufacture the same, what we claim as our invention, and desire to secure by Letters Patent, is—

1. In a friction-brake, the combination of a system of levers connected to the brake, with a friction-wheel on the car-axle, and a shaft capable of sliding longitudinally, carrying a friction-wheel adapted to move into and out of engagement with the first wheel, substantially as described.

2. In a friction-brake, the combination of a system of levers connected to the brake, with a friction-wheel on the car-axle, and a shaft capable of sliding longitudinally, carrying a friction-wheel which is normally kept clear of the friction-wheel on the car-axle by a spring, as herein set forth.

3. In a friction-brake, the combination of a system of levers connected to the brake, with a chain winding on the shaft sliding longitudinally, and a friction-wheel engaging a second friction-wheel on the car-axle, where, by the winding up of the chain, the brakes are applied, substantially as set forth.

4. In a friction-brake, the combination of a system of levers with two beveled friction-wheels, one on the axle of the car and the other on a sliding shaft, the two beveled friction-wheels being normally held apart by a spring engaging the sliding shaft, as herein set forth.

5. In a friction-brake, the combination of the beveled friction-wheel on the car-axle, a shaft capable of sliding longitudinally, carrying a second beveled friction-wheel movable into or out of engagement therewith, a system of levers and connections between said movable shaft and the brake on one truck of the car, and connections between said levers and the levers on the second truck of the car, substantially as set forth.

In testimony whereof we do affix our signatures in presence of two witnesses.

JOHN WYCKOFF.
CHARLES W. LUNQUIST.
MICHAEL J. SMITH.

Witnesses:
C. G. LAYBOURN,
A. C. CLAUSEN.